US012810840B2

(12) United States Patent
Wang et al.

(10) Patent No.: US 12,810,840 B2
(45) Date of Patent: *Nov. 24, 2026

(54) SPEECH PROCESSING METHOD, APPARATUS, ELECTRONIC DEVICE, AND COMPUTER-READABLE STORAGE MEDIUM

(71) Applicant: TENCENT TECHNOLOGY (SHENZHEN) COMPANY LIMITED, Shenzhen (CN)

(72) Inventors: Yan Nan Wang, Shenzhen (CN); Jun Huang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 361 days.

This patent is subject to a terminal disclaimer.

(21) Appl. No.: 18/425,381

(22) Filed: Jan. 29, 2024

(65) Prior Publication Data

US 2024/0169975 A1 May 23, 2024

Related U.S. Application Data

(63) Continuation of application No. 17/460,924, filed on Aug. 30, 2021, now Pat. No. 11,948,552, which is a (Continued)

(30) Foreign Application Priority Data

Sep. 5, 2019 (CN) ........................ 201910838192.6

(51) Int. Cl.

*G10L 15/16* (2006.01)
*G10L 15/02* (2006.01)
(Continued)

(52) U.S. Cl.
CPC ............ *G10L 15/02* (2013.01); *G10L 15/063* (2013.01); *G10L 15/16* (2013.01); *G10L 25/24* (2013.01)

(58) Field of Classification Search
None
See application file for complete search history.

(56) References Cited

U.S. PATENT DOCUMENTS 10,388,274 B1 * 8/2019 Hoffmeister ........ G06F 16/3347
10,923,111 B1 2/2021 Fan et al.
(Continued)

FOREIGN PATENT DOCUMENTS

CN 108447490 A 8/2018
CN 109065067 A 12/2018
(Continued)

OTHER PUBLICATIONS

Extended European Search Report dated May 10, 2022 in Application No. 20860732.5.
(Continued)

*Primary Examiner* — Jakieda R Jackson
(74) *Attorney, Agent, or Firm* — Sughrue Mion, PLLC

(57) ABSTRACT

A speech processing method, performed by an electronic device, includes determining a first speech feature and a first text bottleneck feature based on to-be-processed speech information, determining a first combined feature vector based on the first speech feature and the first text bottleneck feature, inputting the first combined feature vector to a trained unidirectional long short-term memory (LSTM) model, performing speech processing on the first combined feature vector to obtain speech information after noise reduction, and transmitting the obtained speech information after noise reduction to another electronic device for playing.

20 Claims, 5 Drawing Sheets

Related U.S. Application Data continuation of application No. PCT/CN2020/101602, filed on Jul. 13, 2020.

(51) Int. Cl.
*G10L 15/06* (2013.01)
*G10L 25/24* (2013.01)

(56) References Cited

U.S. PATENT DOCUMENTS

| | | | | |
|---|---|---|---|---|
| 11,069,352 | B1 | 7/2021 | Tang et al. | |
| 11,158,307 | B1 | 10/2021 | Ghias et al. | |
| 2008/0159403 | A1 | 7/2008 | Dunning | |
| 2011/0035215 | A1 | 2/2011 | Sompolinsky et al. | |
| 2016/0210551 | A1* | 7/2016 | Lee | G06F 40/20 |
| 2018/0025721 | A1 | 1/2018 | Li et al. | |
| 2018/0053108 | A1* | 2/2018 | Olabiyi | B60W 40/09 |
| 2018/0166067 | A1* | 6/2018 | Dimitriadis | G10L 15/04 |
| 2018/0182377 | A1* | 6/2018 | Li | G10L 15/02 |
| 2019/0066713 | A1* | 2/2019 | Mesgarani | G10L 17/26 |
| 2019/0318755 | A1 | 10/2019 | Tashev et al. | |

FOREIGN PATENT DOCUMENTS

| | | | |
|---|---|---|---|
| CN | 109785852 | A | 5/2019 |
| CN | 109841226 | A | 6/2019 |
| CN | 109859767 | A | 6/2019 |
| CN | 110379412 | A | 10/2019 |
| JP | 2017-134321 | A | 8/2017 |

OTHER PUBLICATIONS

International Search Report for PCT/CN2020/101602 dated Sep. 29, 2020 [PCT/ISA/210].

Keisuke Kinoshita et al., "Text-informed speech enhancement with deep neural networks", Interspeech 2015, 16th Annual Conference of the International Speech Communication Association, Sep. 6-10, 2015, Dresden Germany, pp. 1760-1764 (5 pages total).

Supplementary Search Report dated May 30, 2022 in Application No. 20860732.5.

Translation of Written Opinion of the International Searching Authority issued Sep. 30, 2020 in International Application No. PCT/CN2020/101602.

Written Opinion for PCT/CN2020/101602 dated Sep. 29, 2020 [PCT/ISA/237].

Yu Gu et al., "Speech Bandwidth Extension Using Bottleneck Features and Deep Recurrent Neural Networks", Interspeech 2016, Sep. 8-12, 2016, San Francisco, vol. 2016, USA, pp. 297-301 (5 pages total).

* cited by examiner

SPEECH PROCESSING METHOD, APPARATUS, ELECTRONIC DEVICE, AND COMPUTER-READABLE STORAGE MEDIUM

CROSS REFERENCE TO RELATED APPLICATION(S)

This application is a continuation application of U.S. application Ser. No. 17/460,924, filed Aug. 30, 2021, which is a continuation application of International Application No. PCT/CN2020/101602, which claims priority to Chinese Patent Application No. 201910838192.6, filed with the China National Intellectual Property Administration on Sep. 5, 2019, the entire contents of which are incorporated by reference herein.

FIELD

The disclosure generally relates to the field of computer technologies, and specifically, to a speech processing method and apparatus, an electronic device, and a computer-readable storage medium.

BACKGROUND

In a process of denoising speech information with noise, a text information extraction method in text-to-speech (TTS) is typically used to extract corresponding text information. The corresponding text information is spliced into features of speech with noise and is transmitted to a noise reduction network model for training.

SUMMARY

According to an aspect of example embodiments, a speech processing method, performed by an electronic device, may include determining a first speech feature and a first text bottleneck feature based on to-be-processed speech information, determining a first combined feature vector based on the first speech feature and the first text bottleneck feature, inputting the first combined feature vector to a trained unidirectional long short-term memory (LSTM) model, performing speech processing on the first combined feature vector to obtain speech information after noise reduction, and transmitting the obtained speech information after noise reduction to another electronic device for playing.

According to an aspect of example embodiments, a speech processing apparatus may include at least one memory configured to store computer program code and at least one processor configured to access said computer program code and operate as instructed by said computer program code, said computer program code including first determining code configured to cause the at least one processor to determine a first speech feature and a first text bottleneck feature based on to-be-processed speech information, second determining code configured to cause the at least one processor to determine a first combined feature vector based on the first speech feature and the first text bottleneck feature, inputting code configured to cause the at least one processor to input the first combined feature vector to a trained unidirectional LSTM model, performing code configured to cause the at least one processor to perform speech processing on the first combined feature vector to obtain speech information after noise reduction, and transmitting code configured to cause the at least one processor to transmit the speech information after noise reduction to another electronic device for playing.

According to an aspect of example embodiments, a non-transitory computer-readable storage medium may store computer instructions that, when executed by at least one processor of a device, cause the at least one processor to determine a first speech feature and a first text bottleneck feature based on to-be-processed speech information, determine a first combined feature vector based on the first speech feature and the first text bottleneck feature, input the first combined feature vector to a trained unidirectional LSTM model, perform speech processing on the first combined feature vector, to obtain speech information after noise reduction, and transmit the obtained speech information after noise reduction to another electronic device for playing.

According to an aspect of example embodiments, a computer program product may include instructions, the instructions, when run on a computer, causing the computer to perform the foregoing method for processing speech.

According to an aspect of example embodiments, an electronic device may include a processor, a memory, and a bus; the bus being configured to connect the processor and the memory; the memory being configured to store operation instructions; and the processor being configured to perform the speech processing method by invoking the operation instructions.

BRIEF DESCRIPTION OF THE DRAWINGS

In order to describe the technical solutions in the example embodiments of the disclosure more clearly, the following briefly describes the accompanying drawings for describing the example embodiments. Apparently, the accompanying drawings in the following description merely show some embodiments of the disclosure, and a person of ordinary skill in the art may still derive other accompanying drawings from these accompanying drawings without creative efforts.

DETAILED DESCRIPTION

Figure 1A:
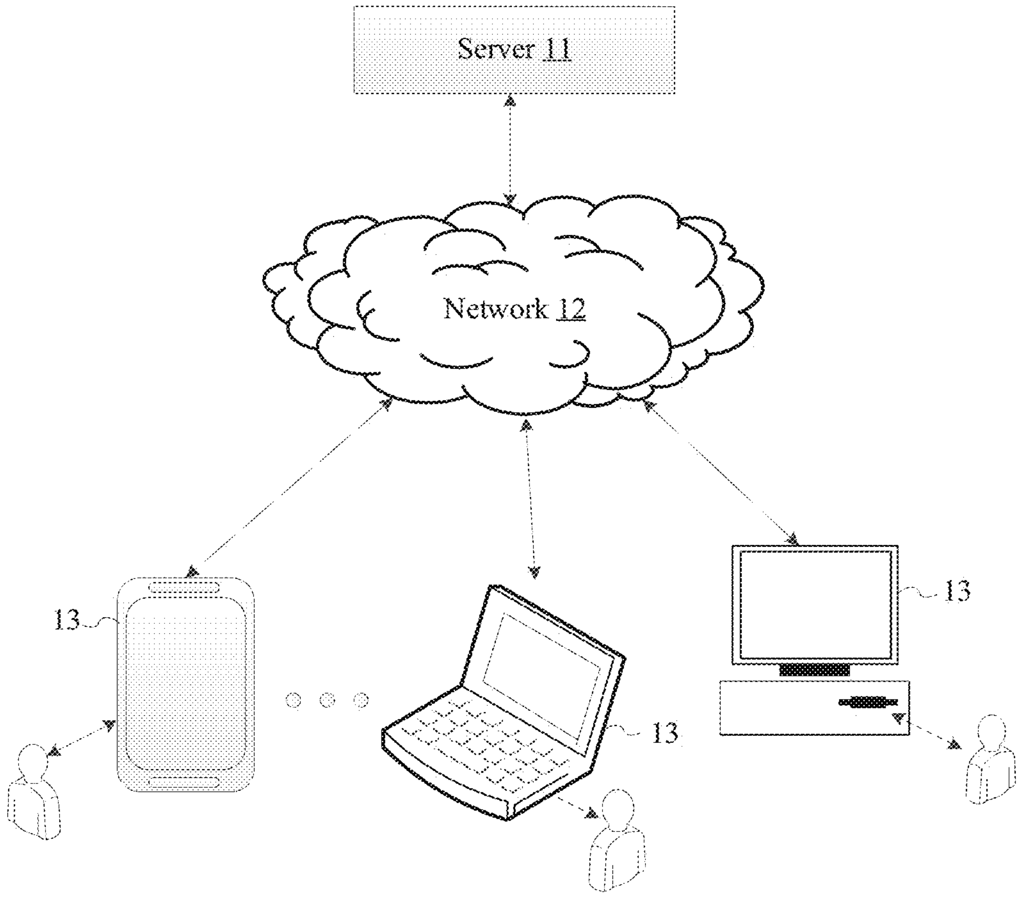
FIG. 1A is a diagram of a system configured for a speech processing method according to an embodiment.

To make the invention objectives, features, and advantages of this application clearer and more comprehensible, the following describes the technical solutions in the embodiments with reference to the accompanying drawings in the embodiments. The embodiments described are merely some rather than all of the embodiments. All other embodiments understood by a person of ordinary skill in the art based on the embodiments without creative efforts shall fall within the protection scope of this application.

The following describes embodiments in detail. Examples of the embodiments are shown in the accompanying drawings. The same or similar elements and the elements having same or similar functions are denoted by like reference numerals throughout the descriptions. The embodiments that are described below with reference to the accompanying drawings are exemplary, and are only used to interpret this application and cannot be construed as a limitation to this application.

A person skilled in the art may understand that, the singular forms "a", "an", and "the" used herein may include the plural forms as well, unless the context clearly indicates otherwise. It is to be further understood that, the terms "include" and/or "comprise" used in this specification of this application refer to the presence of stated features, integers, steps, operations, elements, and/or components, but do not preclude the presence or addition of one or more other features, integers, steps, operations, elements, components, and/or combinations thereof. It is to be understood that, when an element is "connected" or "coupled" to another element, the element may be directly connected to or coupled to another element, or an intermediate element may exist. In addition, the "connection" or "coupling" used herein may include a wireless connection or a wireless coupling. The term "and/or" used herein includes all of or any of units and all combinations of one or more related listed items.

Artificial intelligence (AI) is a theory, method, technology, and application system that uses a digital computer or a machine controlled by the digital computer to simulate, extend, and expand human intelligence, perceive an environment, obtain knowledge, and use knowledge to obtain an optimal result. In other words, the AI is a comprehensive technology of computer science, which attempts to understand essence of intelligence and produces a new intelligent machine that can respond in a manner similar to human intelligence. The AI is to study the design principles and implementation methods of various intelligent machines, to enable the machines to have the functions of perception, reasoning, and decision-making.

The AI technology is a comprehensive discipline, and relates to a wide range of fields including a hardware-level technology and a software-level technology. Basic AI technologies generally include technologies such as a sensor, a dedicated AI chip, cloud computing, distributed storage, a big data processing technology, an operating/interaction system, and electromechanical integration. AI software technologies may include several major fields such as a computer vision technology, a speech processing technology, a natural language processing technology, and machine learning or deep learning.

Key technologies of the speech technology include an ASR technology, a TTS technology, and a voiceprint recognition technology. To make a computer capable of listening, seeing, speaking, and feeling is the future development direction of human-computer interaction, and speech has become one of the most promising human-computer interaction methods in the future.

To better understand and describe the embodiments disclosed herein, the following briefly describes some technical terms involved in the embodiments.

A neural network may refer to an algorithm mathematic model that imitates behavior features of animal neural networks and performs distributed parallel information processing. Such a network, depending on complexity of a system, achieves a purpose of processing information by adjusting interconnection between a large quantity of internal nodes.

A deep neural network (DNN) is a feedforward neural network that has at least one hidden layer, uses an activation function for de-linearity, uses cross entropy (CE) as a loss function, and uses back propagation optimization algorithms (for example, a stochastic gradient descent algorithm and a batch gradient descent algorithm) for learning and training (i.e., adjusting and updating weights between neurons).

An objective of ASR technologies is to enable a computer to dictate continuous speech spoken by different people, which is commonly known as a speech dictation machine. ASR is a technology that implements speech-to-text conversion. ASR may also be referred to as speech recognition or computer speech recognition.

A Mel-frequency cepstrum coefficient (MFCC) considers human auditory features. A linear spectrum is first mapped to a Mel non-linear spectrum based on auditory perception, and then is converted to a cepstrum. A Mel frequency is provided based on human auditory features, and has a non-linear correspondence to a Hz frequency. The MFCC uses such a relationship between the Mel frequency and the Hz frequency, and a Hz spectrum feature obtained through calculation is used for speech data feature extraction and reduction of operation dimensions.

A probability distribution softmax layer may refer to an output of a softmax layer that is a series of positive numbers that add up to 1 (i.e., an output obtained from the softmax layer can be considered as a probability distribution). The softmax layer turns an output of a neural network into a probability distribution.

Speech enhancement may refer to a technology of extracting a useful speech signal from a noise background and suppressing and reducing noise interference after a speech signal is interfered with or even submerged by various noises, to extract original speech as clean as possible from the speech with noise.

CE may be considered as expressing a degree of difficulty of a probability distribution p(x) through a probability distribution q(x). CE describes a distance between the two probability distributions q(x) and p(x). That is, when a CE value is smaller (i.e., a relative entropy value is smaller), the two probability distributions q(x) and p(x) are closer. A CE loss function is often used in classification problems, especially neural network classification problems. Since CE involves calculating a probability of each category, in a neural network, CE is closely related to a softmax function.

An LSTM network is a time recurrent neural network suitable for processing and predicting important events with relatively long intervals and delays in time series. LSTM may be utilized to resolve a problem of gradient disappearance in a structure of a recurrent neural network (RNN) structure, which is a special RNN. An LSTM network is an artificial neural network including LSTM blocks. The LSTM block may be an intelligent network unit. The LSTM block may memorize a value of a variable length of time. A gate in the LSTM block can determine whether an input is important enough to be memorized and whether an output can be produced.

A Gaussian mixture model (GMM) uses a Gaussian probability density function (e.g., a normal distribution curve) to accurately quantify things, and decompose one thing into several models based on the Gaussian probability density function (e.g., the normal distribution curve). An example principle and process of establishing a Gaussian model for an image background may be as follows:

An image grayscale histogram reflects a frequency of a specific grayscale value in an image, which may also be considered as an estimate of a grayscale probability density of the image. The GMM uses K Gaussian models to represent features of each pixel in the image, K being a positive integer. After a new frame of image is obtained, the GMM is updated, and each pixel in a current image is matched with the GMM. If matching succeeds, the pixel is determined as a background point, or otherwise, this pixel is a foreground point. Throughout the entire Gaussian model, it is mainly determined by using two parameters: a variance and a mean. For learning of the mean and the variance, the use of different learning mechanisms directly affects stability, accuracy, and convergence of the model.

In a process of extracting text information by using a text information extraction method in TTS, a noise reduction network model for extracting text information has the following deficiencies. First, text information is required for testing, and it may be difficult to apply the method to actual applications. Furthermore, since it is necessary to align the text information with a speech feature with noise, it may be difficult to implement real-time operation, and alignment accuracy affects a noise reduction result. Additionally, trained noise-reduction speech typically has a corresponding text annotation, but it may be difficult to obtain a large amount of training corpora in practice.

The present disclosure provides a speech processing method. The technical solutions provided in the embodiments relate to AI speech technology. The technical solutions and how to resolve the foregoing technical problems according to the technical solutions of this application are described below in detail by.

FIG. 1A is a diagram of a system configured for a speech processing method according to an embodiment. Referring to FIG. 1A, the architectural diagram of the system includes: a server 11, a network 12, and a user terminal 13. The server 11 is connected to the user terminal 13 by the network 12.

In some embodiments, the server 11 may be a backend server that processes to-be-processed speech information. The server 11 and the user terminal 13 provide services for a user together. For example, after processing the to-be-processed speech information, the server 11 transmits the processed speech information to the user terminal 13 for use by the user. The server 11 may be an independent server or a server cluster including a plurality of servers.

The network 12 may include a wired network and a wireless network. As shown in FIG. 1A, on a side of an access network, the user terminal 13 may access the network 12 in a wireless or wired manner. However, on a side of a core network, the server 11 is usually connected to the network 12 in a wired manner. The server 11 may be alternatively connected to the network 12 in a wireless manner.

The user terminal 13 may be a smart device with a data computing and processing function that may play the processed speech information provided by the server, directly play the processed speech information after the to-be-processed speech information is processed, or transmit the speech information to another user terminal for playing. The user terminal 13 may include, but is not limited to, a smartphone (on which a communication module is installed), a palmtop computer, a tablet computer, or the like. An operating system is installed on the user terminal 13, and may include, but is not limited to, an Android operating system, a Symbian operating system, a Windows mobile operating system, an Apple iPhone OS operating system, and the like.

Based on the architectural diagram of the system shown in FIG. 1A, this embodiment provides a speech processing method, and the speech processing method is performed by an electronic device. The electronic device may be the server 11 in FIG. 1A, or may be the user terminal 13 in FIG. 1A.

Figure 1B:
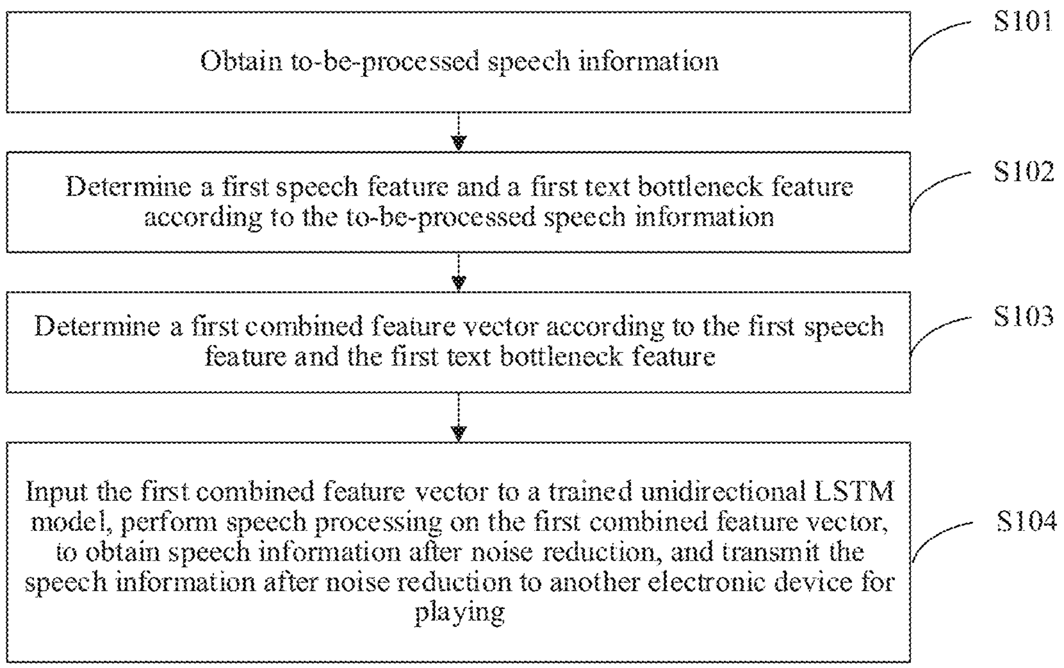
FIG. 1B is a flowchart of a speech processing method according to an embodiment.

FIG. 1B is a flowchart of a speech processing method according to an embodiment:

In operation S101, the electronic device obtains to-be-processed speech information. In some embodiments, the to-be-processed speech information is call speech in a conference system.

In operation S102, the electronic device determines a first speech feature and a first text bottleneck feature based on the to-be-processed speech information. In some embodiments, the first speech feature may be a logarithmic power spectrum feature or an MFCC feature. In some embodiments, the first text bottleneck feature is extracted from a linear layer of a bottleneck. The linear layer of the bottleneck is a bottleneck layer. The bottleneck layer may be the middlemost layer of a multiplayer perceptron. A quantity of neurons in the bottleneck layer is much less than quantities of other layers. Therefore, an entire neural network is like a bottleneck, and a feature extracted from the bottleneck layer is a bottleneck feature.

In operation S103, the electronic device determines a first combined feature vector based on the first speech feature and the first text bottleneck feature. In some embodiments, the first speech feature and the first text bottleneck feature are spliced to obtain the first combined feature vector, a dimension of the first combined feature vector being a sum of a dimension of each frame of the first speech feature and a dimension of the first text bottleneck feature.

In operation S104, the electronic device inputs the first combined feature vector to a trained unidirectional LSTM model, performs speech processing on the first combined feature vector to obtain speech information after noise reduction, and transmits the speech information after noise reduction to another electronic device for playing.

In some embodiments, speech processing is speech enhancement. The essence of speech enhancement is speech noise reduction. Speech acquired by a microphone is usually speech with different noises. A main objective of speech enhancement is to recover speech without noise from speech with noise. Through speech enhancement, various interference signals can be effectively suppressed, and a target speech signal is enhanced, which improves speech intelligibility and voice quality and helps to improve speech recognition.

In an embodiment, to-be-processed speech information is acquired, a first speech feature and a first text bottleneck feature are determined based on the to-be-processed speech information, a first combined feature vector is determined based on the first speech feature and the first text bottleneck feature, the first combined feature vector is inputted to a trained unidirectional LSTM model, and speech processing is performed on the first combined feature vector to obtain speech information after noise reduction. The embodiment implements speech processing based on the first text bottleneck feature, thereby improving efficiency of speech noise reduction and speech quality.

In some embodiments, the determining a first speech feature based the to-be-processed speech information includes performing framing and windowing on the to-be-processed speech information; and extracting the first speech feature from the to-be-processed speech information obtained after the framing and windowing. The first speech feature may include at least one of a logarithmic power spectrum feature and an MFCC feature.

In some embodiments, framing may refer to cutting variable-length audio included in the to-be-processed speech information into fixed-length segments. Framing may be performed because a subsequent Fourier transform is suitable for analyzing a stable signal, but an audio signal changes rapidly. To avoid omission of a signal by a window boundary, when a frame is offset, there should be a frame overlap between frames, and frames should be partially overlapped. One example choice is a frame length is 25 ms, a frame shift is 10 ms, and a time difference between frames may be 10 ms, so that there is an overlap between frames.

In some embodiments, in the Fourier transform, an input signal needs to be stable, but an audio signal is generally not stable. Windowing is a process where each frame of the signal is multiplied by a smooth window function to smoothly attenuate two ends of the frame to zero, so that an intensity of side lobes after the Fourier transform can be reduced to obtain a higher quality spectrum. In addition to a main lobe, there is, in a time domain, a side lobe that does not appear (i.e., spectrum leakage.) Truncation is completed by the window function. The window function has side lobes of different amplitudes. Therefore, during convolution, in addition to amplitude components at a frequency of a discrete point, there are also varying degrees of amplitude between two adjacent frequency points.

In some embodiments, the determining a first text bottleneck feature based on the to-be-processed speech information includes extracting an N-dimensional filter-bank feature and an M-dimensional pitch feature from the to-be-processed speech information, with both N and M being positive integers, splicing the N-dimensional filter-bank feature and the M-dimensional pitch feature to obtain a second speech feature, inputting the second speech feature to a trained ASR network, and extracting the first text bottleneck feature from a linear layer of a bottleneck of the trained ASR network.

In some embodiments, a 40-dimensional filter-bank feature and a 3-dimensional pitch feature are extracted from the to-be-processed speech information, N being 40, M being 3. Pitch is related to a fundamental frequency (FO) of sound, which reflects pitch information (i.e., tone). A filter bank is a group of filters, and a group of filters includes F filters, F being a positive integer. The same signal is filtered and F synchronized signals are outputted, and a different response function, center frequency, gain, and bandwidth may be assigned to each filter. Frequencies of filters in a filter bank are arranged in ascending order and are centered on different frequencies, and a quantity of filters is large enough to determine short-term energy of each output signal at different moments, to obtain a spectrogram.

In some embodiments, the inputting the first combined feature vector to a trained unidirectional LSTM model, and performing speech processing on the first combined feature vector to obtain speech information after noise reduction includes performing speech enhancement on the first combined feature vector by using the trained unidirectional LSTM model, performing inverse feature transformation on a processing result, and converting speech information from a frequency domain to a time domain to obtain the speech information after noise reduction.

In this embodiment, a text-related LSTM model may be used to perform speech processing on the first combined feature vector, thereby improving performance of speech noise reduction.

In some embodiments, a method of training the ASR network includes aligning a text annotation included in a corpus of the ASR network with an audio file corresponding to the text annotation by using a GMM to obtain a first text feature, extracting an N-dimensional filter-bank feature and an M-dimensional pitch feature from the audio file, splicing the N-dimensional filter-bank feature and the M-dimensional pitch feature, to obtain a third speech feature, inputting the third speech feature to the ASR network, training the ASR network to obtain a second text feature outputted by an output layer of the ASR network, and determining a value of CE of the ASR network according to a value of the first text feature and a value of the second text feature. The aforementioned training step may be repeatedly performed to obtain a trained ASR network when a difference between a value of CE of the ASR network obtained through training and a value of CE of the ASR network obtained through training at a previous time is in a first threshold range.

In some embodiments, the output layer of the ASR network is a softmax layer, and the softmax layer outputs a probability distribution to implement a loss function. The loss function may be CE. A normalization value of current outputted values is calculated, a maximum value is set to 1, and the remaining values are 0. The loss function is used for describing a fitting degree between a forward propagation output and an expected value. A classification loss function may be CE, which is used for describing a distance (i.e., similarity) between a network output probability distribution and an expected output probability distribution, and a loss function is used in classification problems.

In this embodiment, a corpus for training the ASR network and a noise reduction training corpus are separated. Thus, noise reduction speech does not need to have a corresponding text annotation, and it is easy to obtain the corpus for training the ASR network. Since backward information is not used during training of the ASR network, real-time processing can be implemented.

In some embodiments, a method of training the unidirectional LSTM model includes acquiring speech with noise and speech without noise included in a noise reduction training corpus, extracting a fourth speech feature and a second text bottleneck feature from the speech with noise, extracting a fifth speech feature from the speech without noise, combining the fourth speech feature and the second text bottleneck feature to obtain a second combined feature vector; inputting the second combined feature vector to the unidirectional LSTM model, and training the unidirectional LSTM model to obtain a trained unidirectional LSTM model when a minimum mean square error between a reference value outputted by the unidirectional LSTM model and a value of the fifth speech feature is less than or equal to a second threshold.

Figure 2:
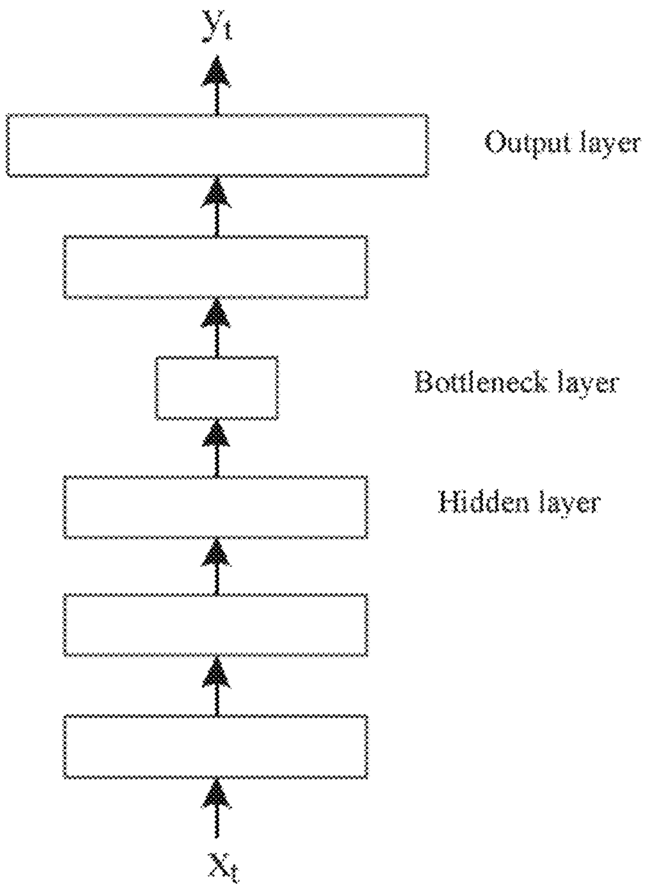
FIG. 2 is a diagram of an automatic speech recognition (ASR) network according to an embodiment.

FIG. 2 is a diagram of an automatic speech recognition (ASR) network according to an embodiment. In some embodiments, as shown in FIG. 2, the ASR network includes a DNN with four hidden layers as an input layer, a linear layer of a bottleneck, and a probability distribution softmax layer as an output layer. $x_t$ is an input of the ASR network, and $y_t$ is an output of the ASR network. $x_t$ is used as an input of a first hidden layer of the ASR network, an output of the first hidden layer of the ASR network is used as an input of a second hidden layer of the ASR network, an output of the second hidden layer of the ASR network is used as an input of a third hidden layer of the ASR network, an output of the third hidden layer of the ASR network is used as an input of a linear layer of the bottleneck of the ASR network, an output of the linear layer of the bottleneck of the ASR network is used as an input of a fourth hidden layer of the ASR network, an output of the fourth hidden layer of the ASR network is used as an input of a softmax layer of the ASR network, and an output of the softmax layer is $y_t$.

This embodiment provides another speech processing method, and the speech processing method is performed by an electronic device. The electronic device may be the server 11 in FIG. 1A, or may be the user terminal 13 in FIG. 1A.

Figure 3:
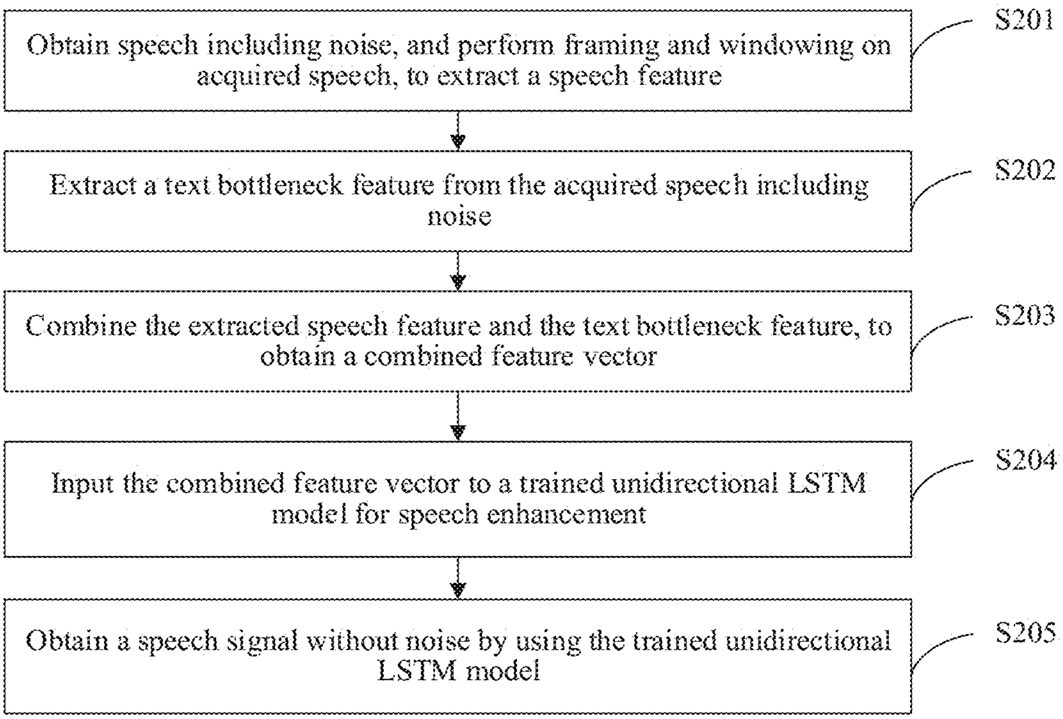
FIG. 3 is a flowchart of a speech processing method according to an embodiment.

FIG. 3 is a flowchart of a speech processing method according to an embodiment In operation S201, the electronic device obtains speech including noise, and performs framing and windowing on acquired speech to extract a speech feature. The speech including noise is to-be-processed speech information, and a speech feature is a first speech feature. In some embodiments, the extracted speech feature may be a logarithmic power spectrum feature or an MFCC feature.

Figure 4:
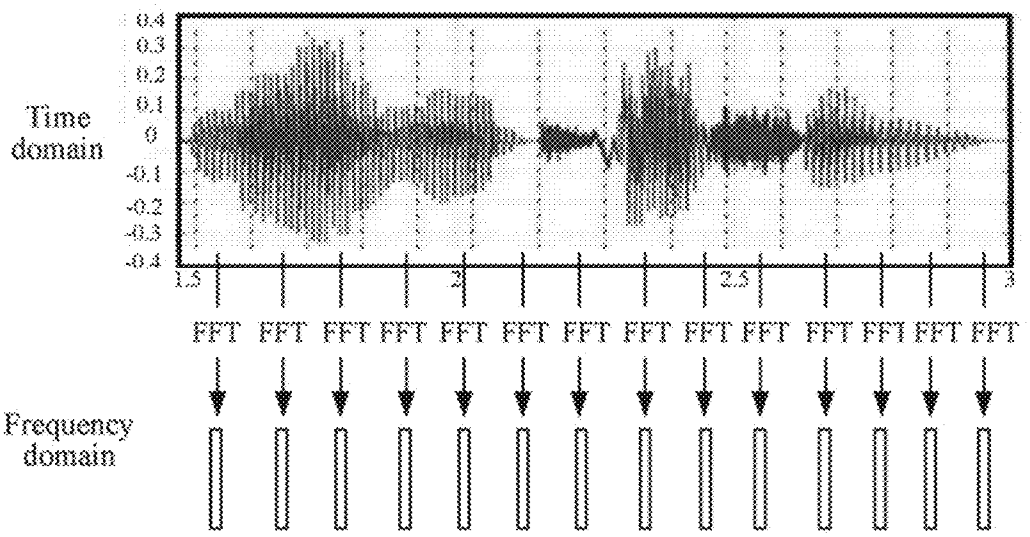
FIG. 4 is a diagram of extracting a speech feature according to an embodiment.

FIG. 4 is a diagram of extracting a speech feature according to an embodiment. In some embodiments, as shown in FIG. 4, framing and windowing are performed on the speech, and fast Fourier transform (FFT) is performed on each frame to determine a discrete power spectrum obtained after the FFT. A logarithm is calculated for the obtained discrete power spectrum to obtain a logarithmic power spectrum (i.e., the speech feature is obtained).

In operation S202, the electronic device extracts a text bottleneck feature from the acquired speech including noise. The text bottleneck feature is a first text bottleneck feature. In some embodiments, a 40-dimensional filter-bank feature and a 3-dimensional pitch feature are extracted from the speech including noise. The 40-dimensional filter-bank feature and the 3-dimensional pitch feature are spliced to obtain a second speech feature. The second speech feature is inputted to a trained ASR network, and the text bottleneck feature is extracted from a linear layer of a bottleneck of the trained ASR network.

In operation S203, the electronic device combines the extracted speech feature and the text bottleneck feature to obtain a combined feature vector. The combined feature vector may be a first combined feature vector. In some embodiments, the speech feature and the text bottleneck feature are spliced, to obtain the combined feature vector, a dimension of the combined feature vector being a sum of a dimension of each frame of the speech feature and a dimension of the text bottleneck feature.

Figure 5:
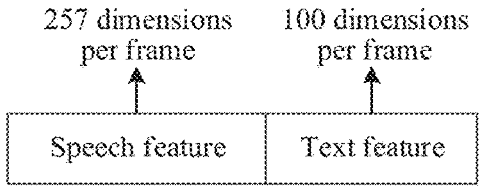
FIG. 5 is a diagram of a combined feature vector according to an embodiment.

FIG. 5 is a diagram of a combined feature vector according to an embodiment. As shown in FIG. 5, the dimension of each frame of the speech feature is 257, the dimension of the text bottleneck feature is 100, and the dimension of the combined feature vector is the sum of the dimension of each frame of the speech feature and the dimension of the text bottleneck feature. That is, the dimension of the combined feature vector is 357.

In operation S204, the electronic device inputs the combined feature vector to a trained unidirectional LSTM model for speech enhancement.

In operation S205, the electronic device obtains a speech signal without noise by using the trained unidirectional LSTM model.

In some embodiments, speech enhancement is performed on an inputted combined speech feature by using the trained unidirectional LSTM model, and inverse feature transformation is performed on an output result of the unidirectional LSTM model to convert the output result of the unidirectional LSTM model from a frequency domain to a time domain to obtain enhanced time domain speech.

In some embodiments, a corpus for training the ASR network includes speech (speech with noise and/or clean speech) and text, and a noise reduction training corpus includes speech with noise and clean speech (speech without noise).

In this embodiment, real-time noise reduction is implemented without text information of speech with noise, and a corpus for training the ASR network and a noise reduction training corpus are separate. Thus, noise reduction speech does not need to have a corresponding text annotation, and it is easy to obtain the corpus for training the ASR network. Since backward information is not used during training of the ASR network, real-time processing can be implemented. Since a text feature is added as an input during training of the unidirectional LSTM model, the unidirectional LSTM model obtained after training obtains positive results that noise in a mute section may be basically eliminated and noise components of a human voice are suppressed, thereby effectively improving noise reduction performance.

Figure 6:
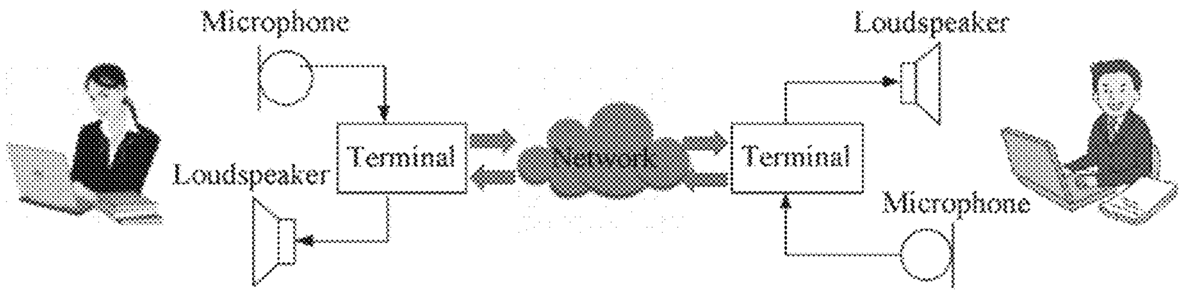
FIG. 6 is a diagram of a conference system according to an embodiment.

FIG. 6 is a diagram of a conference system according to an embodiment. As shown in FIG. 6, in a speech call scenario of a conference system, both parties are participants in a speech call through conference software on a terminal, such as the user terminal shown in FIG. 1A, and the two parties implement the speech call through the conference software. In the speech call, the speech is processed by using modules such as an automatic gain control module, an audio encoding module, an audio decoding module, an echo cancellation module, a speech noise reduction module, and a howling suppression module, the speech noise reduction module being an important module that affects quality of a call. The speech noise reduction module first trains a general ASR network of a linear layer with a bottleneck, and inputs speech with noise of a speaker to the trained ASR network of the linear layer with the bottleneck to extract the text bottleneck feature through the ASR network of the linear layer with the bottleneck. The speech noise reduction module performs framing and windowing on the speech with noise of the speaker, and performs a FFT on each frame to determine a discrete power spectrum obtained after the FFT. A logarithm is calculated for the obtained discrete power spectrum to obtain a logarithmic power spectrum, the logarithmic power spectrum being a speech feature. The speech noise reduction module combines the extracted text bottleneck feature with the speech feature, inputs a combined feature vector to a trained unidirectional LSTM model, performs speech enhancement by using the trained unidirectional LSTM model, and performs inverse feature transformation on an output of the trained unidirectional LSTM model, to output speech of a speaker without noise in a time domain.

The speech noise reduction module optimizes noise reduction performance by introducing a text bottleneck feature of call speech of the speaker. From the text bottleneck feature, the speech frames are effective and the noises need to be eliminated can be effectively obtained, thereby reserving more speech, so that a noise reduction result is further improved. The call is clearer, and a problem of false cancellation of speech is reduced. For example, during a meeting, when the speaker says the sentence “start meeting now”, the ASR network can obtain text content of this speech, then determine that someone is speaking in this speech, and the speech cannot be deleted. The text bottleneck feature of the call speech is obtained by using the trained ASR network to assist with noise reduction, thereby further improving the noise reduction performance and providing better integral experience, so that a problem of false cancellation of partial effective speech caused by noise reduction is greatly improved. The call is smoother, and the quality of the call is improved.

Figure 7:
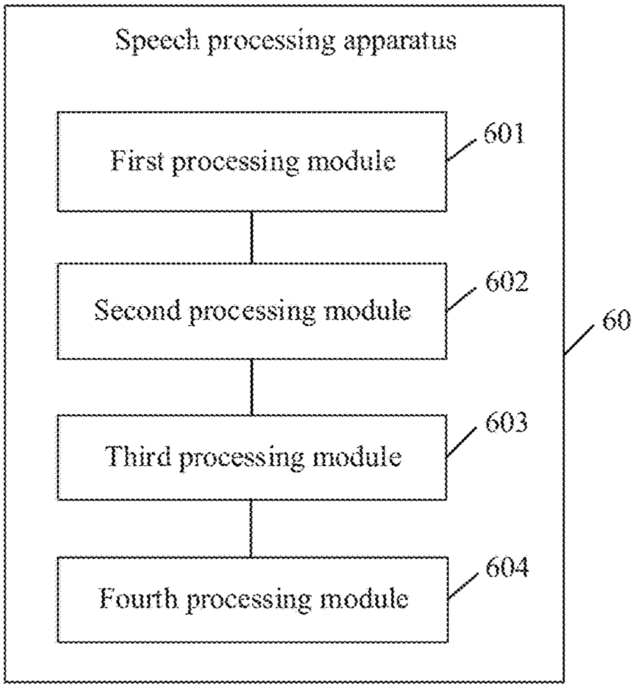
FIG. 7 is diagram of a speech processing apparatus according to an embodiment.

FIG. 7 is diagram of a speech processing apparatus according to an embodiment. One embodiment further provides a speech processing apparatus. The speech processing apparatus 60 includes a first processing module 601, a second processing module 602, a third processing module 603, and a fourth processing module 604.

The first processing module 601 may be configured to obtain to-be-processed speech information. The second processing module 602 may be configured to determine a first speech feature and a first text bottleneck feature based on the to-be-processed speech information. The third processing module 603 may be configured to determine a first combined feature vector based on the first speech feature and the first text bottleneck feature. The fourth processing module 604 may be configured to input the first combined feature vector to a trained unidirectional LSTM model, perform speech processing on the first combined feature vector to obtain speech information after noise reduction, and transmit the speech information after noise reduction to another electronic device for playing.

In some embodiments, the second processing module 602 is configured to perform framing and windowing on the to-be-processed speech information, and extract the first speech feature from the to-be-processed speech information obtained after the framing and windowing, the first speech feature including at least one of a logarithmic power spectrum feature and an MFCC feature.

In some embodiments, the second processing module 602 is configured to extract an N-dimensional filter-bank feature and an M-dimensional pitch feature from the to-be-processed speech information, with both N and M being positive integers, splice the N-dimensional filter-bank feature and the M-dimensional pitch feature to obtain a second speech feature, input the second speech feature to a trained ASR network, and extract the first text bottleneck feature from a linear layer of a bottleneck of the trained ASR network.

In some embodiments, the fourth processing module 604 is configured to perform speech enhancement on the first combined feature vector by using the trained unidirectional LSTM model, and perform inverse feature transformation on a processing result, and convert speech information from a frequency domain to a time domain, to obtain the speech information after noise reduction.

In some embodiments, training the ASR network includes aligning a text annotation included in a corpus of the ASR network with an audio file corresponding to the text annotation by using a GMM to obtain a first text feature, extracting an N-dimensional filter-bank feature and an M-dimensional pitch feature from the audio file, splicing the N-dimensional filter-bank feature and the M-dimensional pitch feature to obtain a third speech feature, inputting the third speech feature to the ASR network, training the ASR network to obtain a second text feature outputted by an output layer of the ASR network, and determining a value of CE of the ASR network based on a value of the first text feature and a value of the second text feature. The aforementioned steps may be repeatedly performed to obtain a trained ASR network when a difference between a value of CE of the ASR network obtained through training and a value of CE of the ASR network obtained through training at a previous time is in a first threshold range.

In some embodiments, training the unidirectional LSTM model includes acquiring speech with noise and speech without noise included in a noise reduction training corpus, extracting a fourth speech feature and a second text bottleneck feature from the speech with noise, extracting a fifth speech feature from the speech without noise, combining the fourth speech feature and the second text bottleneck feature to obtain a second combined feature vector, inputting the second combined feature vector to the unidirectional LSTM model, and training the unidirectional LSTM model, to obtain a trained unidirectional LSTM model when a minimum mean square error between a reference value outputted by the unidirectional LSTM model and a value of the fifth speech feature is less than or equal to a second threshold.

In some embodiments, the ASR network includes a DNN with four hidden layers as an input layer, a linear layer of a bottleneck, and a probability distribution softmax layer as an output layer.

Application of the embodiments at least has the following beneficial effects:

To-be-processed speech information is acquired, a first speech feature and a first text bottleneck feature are determined based on the to-be-processed speech information, a first combined feature vector is determined based on the first speech feature and the first text bottleneck feature, the first combined feature vector is inputted to a trained unidirectional LSTM model, and speech processing is performed on the first combined feature vector to obtain speech information after noise reduction. This embodiment implements speech processing based on the first text bottleneck feature, thereby improving efficiency of speech noise reduction and speech quality.

Figure 8:
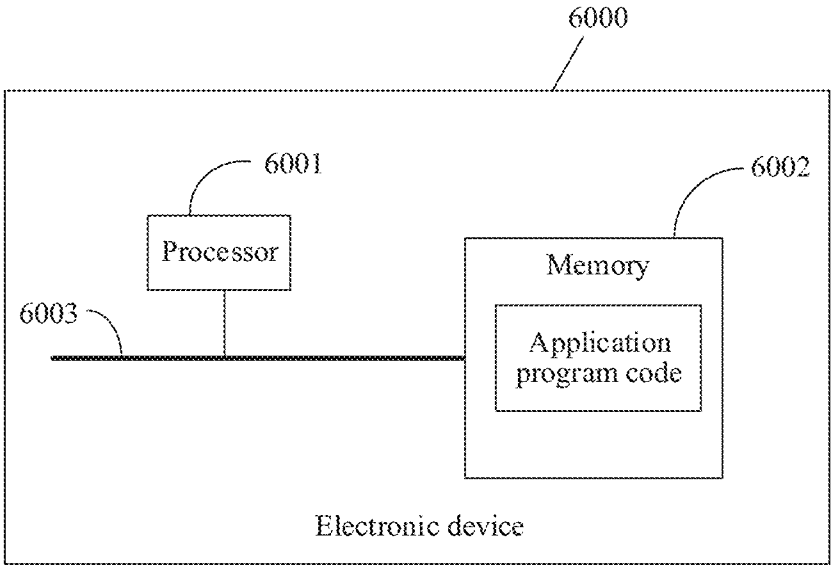
FIG. 8 is a diagram of an electronic device according to an embodiment.

FIG. 8 is a diagram of an electronic device according to an embodiment. The electronic device 6000 includes at least one processor 6001, a memory 6002, and a bus 6003. The at least one processor 6001 is electrically connected to the memory 6002. The memory 6002 is configured to store at least one computer-executable instruction. The processor 6001 is configured to execute the at least one computer-executable instruction, to implement steps of any speech processing method provided in any embodiment or any optional implementation in Embodiment 1 of this application.

Further, the processor 6001 may be a field-programmable gate array (FPGA) or another device with logic processing capabilities, such as a micro controller unit (MCU), or a central process unit (CPU).

Application of the embodiments at least has the following beneficial effects:

To-be-processed speech information is acquired, a first speech feature and a first text bottleneck feature are determined based the to-be-processed speech information, a first combined feature vector is determined according to the first speech feature and the first text bottleneck feature, the first combined feature vector is inputted to a trained unidirectional LSTM model, and speech processing is performed on the first combined feature vector to obtain speech information after noise reduction. This embodiment implements speech processing based on the first text bottleneck feature, thereby improving efficiency of speech noise reduction and speech quality.

One embodiment further provides a non-transitory computer-readable storage medium, storing a computer program, the computer program, when executed by a processor, being configured to implement steps of any speech processing method provided in any embodiment.

The computer-readable storage medium provided in the embodiments includes, but is not limited to any type of disk (including a floppy disk, a hard disk, an optical disc, a compact disc read-only memory (CD-ROM), and a magnetic disk), a read-only memory (ROM), a random access memory (RAM), an erasable programmable ROM (EPROM), an electrically erasable programmable ROM (EEPROM), a flash memory, a magnetic card or an optical card. That is, the readable storage medium includes any medium that stores or transmits information in a readable form by a device (for example, a computer).

Application of the embodiments at least has the following beneficial effects:

To-be-processed speech information is acquired, a first speech feature and a first text bottleneck feature are determined based on the to-be-processed speech information, a first combined feature vector is determined based on the first speech feature and the first text bottleneck feature, the first combined feature vector is inputted to a trained unidirectional LSTM model, and speech processing is performed on the first combined feature vector to obtain speech information after noise reduction. This embodiment implements speech processing based on the first text bottleneck feature, thereby improving efficiency of speech noise reduction and speech quality.

A person skilled in the art may understand that, each block of the structural diagrams and/or the block diagrams and/or flowcharts, and combinations of blocks in the structural diagrams and/or the block diagrams and/or flowcharts, can be implemented by computer program instructions. A person skilled in the art may understand that, these computer program instructions can be provided to a processor of a general-purpose computer, special-purpose computer, or other programmable data processing apparatus, such that the instructions, which execute via the processor of the computer or other programmable data processing apparatus, can implement the solutions specified in one or more blocks of the structural diagrams and/or the block diagrams and/or flowcharts disclosed by this application.

A person skilled in the art may understand that, the various operations, methods, and steps, measures, and solutions in the process that have been discussed in this application can be alternated, changed, combined, or deleted. Further, the various operations, methods, and steps, measures, and solutions in the process that have been discussed in this application can also be alternated, changed, combined, or deleted. Further, the various operations, methods, and steps, measures, and solutions in the process that are in the related art and disclosed in this application can also be alternated, changed, combined, or deleted.

The foregoing descriptions are some implementations of this application. A person of ordinary skill in the art may make several improvements and refinements without departing from the principle of this application, and the improvements and refinements shall fall within the protection scope of this application.

What is claimed is:

1. A speech processing method, performed by an electronic device, the method comprising:

determining a first speech feature and a first text bottleneck feature based on to-be-processed speech information;

determining a first combined feature vector based on the first speech feature and the first text bottleneck feature;

inputting the first combined feature vector to a trained unidirectional long short-term memory (LSTM) model;

performing speech processing on the first combined feature vector to obtain speech information after noise reduction; and transmitting the obtained speech information after noise reduction to another electronic device for playing.

2. The method of claim 1, wherein the determining the first speech feature based on the to-be-processed speech information comprises:

performing framing and windowing on the to-be-processed speech information; and extracting the first speech feature from the to-be-processed speech information obtained after the framing and windowing, wherein the first speech feature includes at least one of a logarithmic power spectrum feature and a Mel-frequency cepstrum coefficient (MFCC) feature.

3. The method of claim 1, wherein the determining the first text bottleneck feature based on the to-be-processed speech information comprises at least one of:

extracting an N-dimensional filter-bank feature and an M-dimensional pitch feature from the to-be-processed speech information, wherein N and M are positive integers;

splicing the N-dimensional filter-bank feature and the M-dimensional pitch feature to obtain a second speech feature;

inputting the second speech feature into a trained automatic speech recognition (ASR) network; and extracting the first text bottleneck feature from a linear layer of a bottleneck of the trained ASR network.

4. The method of claim 3, wherein the ASR network is trained by:

(a) aligning a text annotation included in a corpus with an audio file corresponding to the text annotation by using a Gaussian mixture model (GMM) to obtain a first text feature, the corpus being used for training the ASR network;

(b) extracting an N-dimensional filter-bank feature and an M-dimensional pitch feature from the audio file;

(c) splicing the N-dimensional filter-bank feature and the M-dimensional pitch feature to obtain a third speech feature;

(d) inputting the third speech feature to the ASR network and training the ASR network to obtain a second text feature outputted by an output layer of the ASR network;

(e) determining a value of cross entropy (CE) of the ASR network based on a value of the first text feature and a value of the second text feature; and repeatedly performing steps (a)-(e) to obtain a trained ASR network when a difference between a first value of CE of the ASR network obtained through training and a second value of CE of the ASR network obtained through training at a previous time is in a first threshold range.

5. The method of claim 4, wherein the ASR network comprises a deep neural network (DNN) with four hidden layers as an input layer, a linear layer of a bottleneck, and a probability distribution softmax layer as an output layer.

6. The method of claim 1, wherein the performing speech processing on the first combined feature vector to obtain speech information after noise reduction comprises:

performing speech enhancement on the first combined feature vector by using the trained unidirectional LSTM model;

performing inverse feature transformation on a processing result; and converting speech information from a frequency domain to a time domain to obtain the speech information after noise reduction.

7. The method of claim 1, wherein the unidirectional LSTM model is trained by:

acquiring speech with noise and speech without noise included in a noise reduction training corpus;

extracting a fourth speech feature and a second text bottleneck feature from the speech with noise;

extracting a fifth speech feature from the speech without noise;

combining the fourth speech feature and the second text bottleneck feature to obtain a second combined feature vector;

inputting the second combined feature vector to the unidirectional LSTM model; and training the unidirectional LSTM model to obtain a trained unidirectional LSTM model when a minimum mean square error between a reference value outputted by the unidirectional LSTM model and a value of the fifth speech feature is less than or equal to a second threshold.

8. A speech processing apparatus, comprising:

at least one memory configured to store computer program code; and at least one processor configured to access said computer program code and operate as instructed by said computer program code, said computer program code including:

first determining code configured to cause the at least one processor to determine a first speech feature and a first text bottleneck feature based on to-be-processed speech information;

second determining code configured to cause the at least one processor to determine a first combined feature vector based on the first speech feature and the first text bottleneck feature;

inputting code configured to cause the at least one processor to input the first combined feature vector to a trained unidirectional long short-term memory (LSTM) model;

performing code configured to cause the at least one processor to perform speech processing on the first combined feature vector to obtain speech information after noise reduction; and transmitting code configured to cause the at least one processor to transmit the speech information after noise reduction to another electronic device for playing.

9. The apparatus of claim 8, wherein the second determining code is further configured to cause the at least one processor to:

perform framing and windowing on the to-be-processed speech information; and extract the first speech feature from the to-be-processed speech information obtained after the framing and windowing, wherein the first speech feature includes at least one of a logarithmic power spectrum feature and a Mel-frequency cepstrum coefficient (MFCC) feature.

10. The apparatus of claim 8, wherein the second determining code is further configured to cause the at least one processor to at least one of:

extract an N-dimensional filter-bank feature and an M-dimensional pitch feature from the to-be-processed speech information, wherein N and M are positive integers;

splice the N-dimensional filter-bank feature and the M-dimensional pitch feature to obtain a second speech feature;

input the second speech feature to a trained automatic speech recognition (ASR) network; and extract the first text bottleneck feature from a linear layer of a bottleneck of the trained ASR network.

11. The apparatus of claim 10, wherein the ASR network is trained by:

(a) aligning a text annotation included in a corpus with an audio file corresponding to the text annotation by using a Gaussian mixture model (GMM) to obtain a first text feature, the corpus being used for training the ASR network;

(b) extracting an N-dimensional filter-bank feature and an M-dimensional pitch feature from the audio file;

(c) splicing the N-dimensional filter-bank feature and the M-dimensional pitch feature to obtain a third speech feature;

(d) inputting the third speech feature to the ASR network and training the ASR network to obtain a second text feature outputted by an output layer of the ASR network;

(e) determining a value of cross entropy (CE) of the ASR network based on a value of the first text feature and a value of the second text feature; and repeatedly performing steps (a)-(e) to obtain a trained ASR network when a difference between a first value of CE of the ASR network obtained through training and a second value of CE of the ASR network obtained through training at a previous time is in a first threshold range.

12. The apparatus of claim 8, wherein the inputting code is further configured to cause the at least one processor to:

perform speech enhancement on the first combined feature vector by using the trained unidirectional LSTM model;

perform inverse feature transformation on a processing result; and convert speech information from a frequency domain to a time domain to obtain the speech information after noise reduction.

13. The apparatus of claim 8, wherein the unidirectional LSTM model is trained by:

acquiring speech with noise and speech without noise included in a noise reduction training corpus;

extracting a fourth speech feature and a second text bottleneck feature from the speech with noise;

extracting a fifth speech feature from the speech without noise;

combining the fourth speech feature and the second text bottleneck feature to obtain a second combined feature vector;

inputting the second combined feature vector to the unidirectional LSTM model; and training the unidirectional LSTM model to obtain a trained unidirectional LSTM model when a minimum mean square error between a reference value outputted by the unidirectional LSTM model and a value of the fifth speech feature is less than or equal to a second threshold.

14. A non-transitory computer-readable storage medium storing computer instructions that, when executed by at least one processor of a device, cause the at least one processor to:

determine a first speech feature and a first text bottleneck feature based on to-be-processed speech information;

determine a first combined feature vector based on the first speech feature and the first text bottleneck feature;

input the first combined feature vector to a trained unidirectional long short-term memory (LSTM) model;

perform speech processing on the first combined feature vector to obtain speech information after noise reduction; and transmit the obtained speech information after noise reduction to another electronic device for playing.

15. The non-transitory computer-readable storage medium of claim 14, wherein the instructions, when executed by at least one processor of a device, further cause the at least one processor to determine the first speech feature based on the to-be-processed speech information by:

performing framing and windowing on the to-be-processed speech information; and extracting the first speech feature from the to-be-processed speech information obtained after the framing and windowing, wherein the first speech feature includes at least one of a logarithmic power spectrum feature and a Mel-frequency cepstrum coefficient (MFCC) feature.

16. The non-transitory computer-readable storage medium of claim 14, wherein the instructions, when executed by at least one processor of a device, further cause the at least one processor to determine the first text bottleneck feature based on the to-be-processed speech information by at least one of:

extracting an N-dimensional filter-bank feature and an M-dimensional pitch feature from the to-be-processed speech information, wherein N and M are positive integers;

splicing the N-dimensional filter-bank feature and the M-dimensional pitch feature to obtain a second speech feature;

inputting the second speech feature into a trained automatic speech recognition (ASR) network; and extracting the first text bottleneck feature from a linear layer of a bottleneck of the trained ASR network.

17. The non-transitory computer-readable storage medium of claim 16, wherein the ASR network is trained by:

(a) aligning a text annotation included in a corpus with an audio file corresponding to the text annotation by using a Gaussian mixture model (GMM) to obtain a first text feature, the corpus being used for training the ASR network;

(b) extracting an N-dimensional filter-bank feature and an M-dimensional pitch feature from the audio file;

(c) splicing the N-dimensional filter-bank feature and the M-dimensional pitch feature to obtain a third speech feature;

(d) inputting the third speech feature to the ASR network and training the ASR network to obtain a second text feature outputted by an output layer of the ASR network;

(e) determining a value of cross entropy (CE) of the ASR network based on a value of the first text feature and a value of the second text feature; and repeatedly performing steps (a)-(e) to obtain a trained ASR network when a difference between a first value of CE of the ASR network obtained through training and a second value of CE of the ASR network obtained through training at a previous time is in a first threshold range.

18. The non-transitory computer-readable storage medium of claim 17, wherein the ASR network comprises a deep neural network (DNN) with four hidden layers as an input layer, a linear layer of a bottleneck, and a probability distribution softmax layer as an output layer.

19. The non-transitory computer-readable storage medium of claim 14, wherein the instructions, when executed by at least one processor of a device, further cause the at least one processor to perform speech processing on the first combined feature vector to obtain speech information after noise reduction by:

performing speech enhancement on the first combined feature vector by using the trained unidirectional LSTM model;

performing inverse feature transformation on a processing result; and converting speech information from a frequency domain to a time domain to obtain the speech information after noise reduction.

20. The non-transitory computer-readable storage medium of claim 14, wherein the unidirectional LSTM model is trained by:

acquiring speech with noise and speech without noise included in a noise reduction training corpus;

extracting a fourth speech feature and a second text bottleneck feature from the speech with noise;

extracting a fifth speech feature from the speech without noise;

combining the fourth speech feature and the second text bottleneck feature to obtain a second combined feature vector;

inputting the second combined feature vector to the unidirectional LSTM model; and training the unidirectional LSTM model to obtain a trained unidirectional LSTM model when a minimum mean square error between a reference value outputted by the unidirectional LSTM model and a value of the fifth speech feature is less than or equal to a second threshold.

* * * * *